United States Patent [19]

Takeuchi

[11] Patent Number: 4,591,882

[45] Date of Patent: May 27, 1986

[54] PRINTER ELECTROMAGNETIC CLUTCH DRIVE

[75] Inventor: Shuhei Takeuchi, Morioka, Japan

[73] Assignee: Alps Electric Co., Ltd., Japan

[21] Appl. No.: 716,744

[22] Filed: Mar. 27, 1985

[30] Foreign Application Priority Data

Mar. 29, 1984 [JP] Japan ............................ 59-44150[U]

[51] Int. Cl.[4] ...................... G01D 15/34; B65H 20/00; B65H 75/30; B41J 19/14

[52] U.S. Cl. .................................. 346/136; 192/84 C; 226/182; 226/188; 242/46.4; 400/545; 400/551

[58] Field of Search .................. 346/136, 76; 400/545, 400/551; 192/84 C; 226/182, 188; 242/46.4

[56] References Cited

U.S. PATENT DOCUMENTS 3,768,714 10/1973 Applequist et al. .............. 226/37 X
3,889,275 6/1975 Miller .................................. 346/136
4,508,203 4/1985 Packard et al. .................. 192/84 C

*Primary Examiner*—E. A. Goldberg
*Assistant Examiner*—Gerald E. Preston
*Attorney, Agent, or Firm*—Guy W. Shoup

[57] ABSTRACT

A printer such as a thermal printer includes a reversible motor, a paper feed driver angularly movable through a desired angle in response to operation of the motor, a paper feeder rotatable for feeding a sheet of paper, and an electromagnetic clutch operatively connected between the paper feed driver and the rotatable paper feeder. The electromagnetic clutch comprises a first yoke, a second yoke disposed in confronting relation to the first yoke normally in spaced relation thereto, and an exciting coil wound around one of the first and second yokes, the first yoke being coupled to the paper feed driver, the second yoke being coupled to the rotatable paper feeder, the arrangement being such that when the paper feed driver is turned in a direction to feed the sheet of paper, the exciting coil is energized to attract the first and second yokes magnetically to each other for thereby causing the paper feed driver to rotate the rotatable paper feeder to feed the sheet of paper through the electromagnetic clutch.

3 Claims, 4 Drawing Figures

PRINTER ELECTROMAGNETIC CLUTCH DRIVE

BACKGROUND OF THE INVENTION

The present invention relates to a printer such as a thermal printer, and more particularly to a paper feed mechanism for use therein.

Known paper feed mechanisms for use in printers such as thermal printers typically include a driver angularly movable by a stepping motor, and a rotatable paper feeder such as a paper feed shaft. A ratchet is often disposed between the driver and the rotatable shaft for rotating the shaft in a desired direction only when the driver is angularly moved in one direction for feeding paper.

Although the stepping motor is capable of controlling small incremental motion, the ratchet cannot be angularly moved through a small angle due to the limited pitch of the ratchet teeth of the ratchet. Therefore, the line-to-line interval on the recording paper cannot be varied, or high-resolution graphic patterns cannot be printed. The pitch of the ratchet teeth may be reduced, but only to a limited extent, and a ratchet having the increased number of ratchet teeth required by reducing the pitch would be difficult to form. The printer would also be susceptible to trouble due to wear on the ratchet teeth.

SUMMARY OF THE INVENTION

It is an object of the present invention to provide a printer having a paper feed mechanism capable of feeding a sheet of recording paper at desired intervals so that the line-to-line distance can be adjusted and graphic patterns can be printed.

According to the present invention, a printer includes a reversible motor and a paper feed driver angularly movable through a desired angle in response to operation of the motor. A paper feeder rotatable for feeding a sheet of paper is provided, and an electromagnetic clutch is operatively connected between the paper feed driver and the rotatable paper feeder. The electromagnetic clutch comprises a first yoke, a second yoke disposed in confronting relation to the first yoke normally in spaced relation thereto, and an exciting coil wound around one of the first and second yokes. The first yoke is coupled to the paper feed driver, and the second yoke is coupled to the rotatable paper feeder so that when the paper feed driver is turned in a direction to feed the sheet of paper, the exciting coil is energized to attract the first and second yokes magnetically to each other to thereby cause the paper feed driver to rotate the rotatable paper feeder to feed the sheet of paper through the electromagnetic clutch.

The above and other objects, features and advantages of the present invention will become more apparent from the following description taken in conjunction with the accompanying drawings illustrating a preferred embodiment of the present invention.

DESCRIPTION OF THE PREFERRED EMBODIMENT

Figure 1:
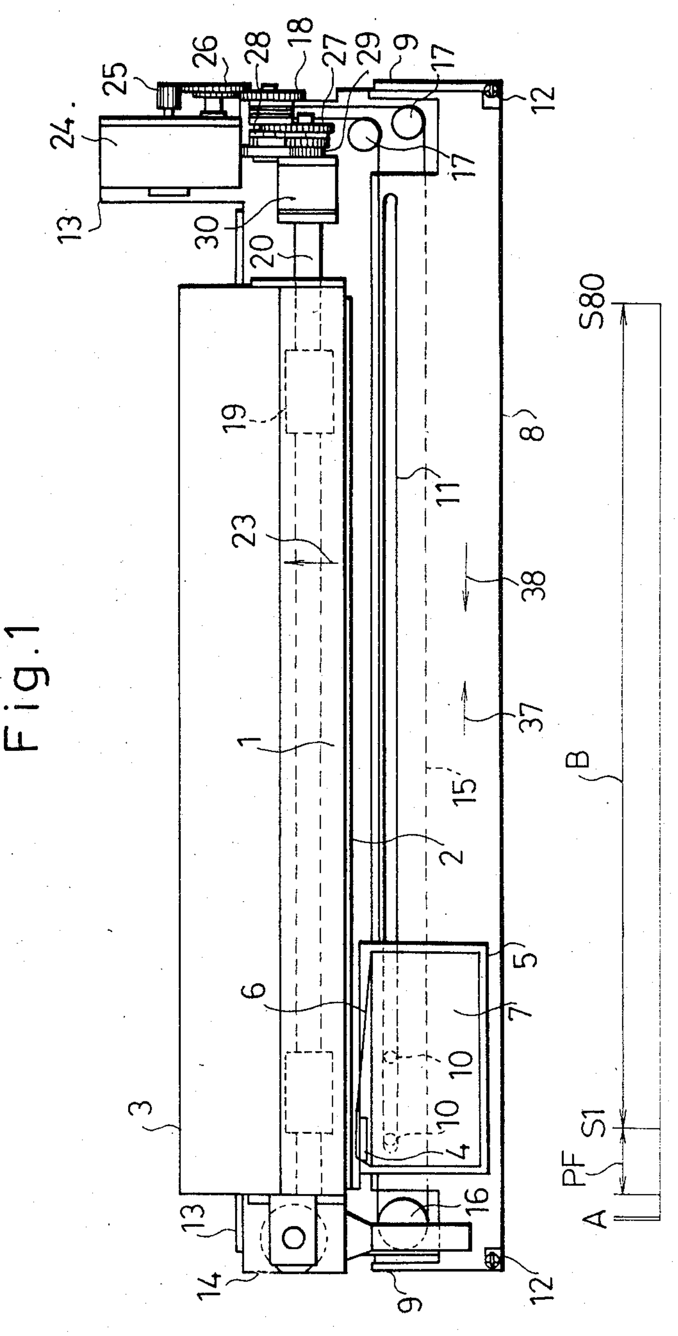
FIG. 1 is a plan view of a thermal printer incorporating a paper feed mechanism according to the present invention.
Figure 2:
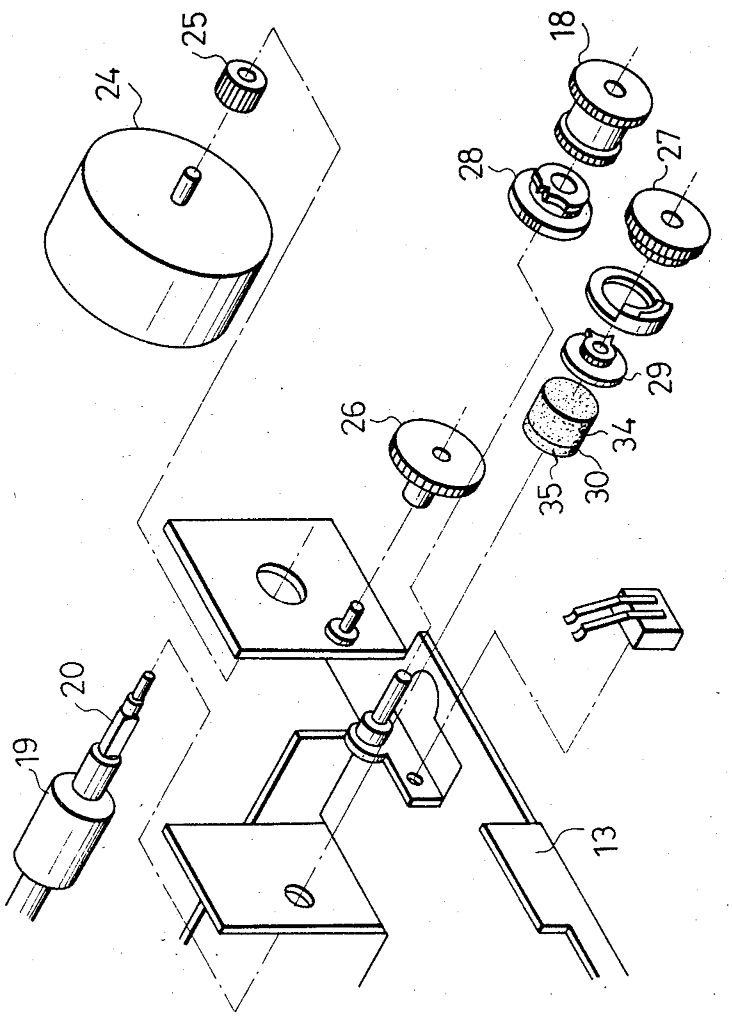
FIG. 2 is an exploded perspective view of a portion of the thermal printer shown in FIG. 1.

A thermal printer in which a paper feed mechanism of the present invention is incorporated will be described with reference to FIG. 1.

The thermal printer includes a platen 1 adapted to receive a sheet of recording paper wound partially therearound and strip 2 of rubber or similar material mounted on a front wall of the platen 1. A paper guide 3 is provided for guiding the sheet around the platen 1; and a thermal head 4 having a number of heating resistor elements is mounted on a carriage 5 in confronting relation to the rubber strip 2. A print tape 6 having a hot-melt material to be transferred to the sheet is accommodated in a tape cassette 7 removably mounted on the carriage 5. The carriage 5 is movably mounted on a carriage guide plate 8 angularly movable about supports 9, and has a slot 11 guiding therein carriage guide pins 10 fixed to the carriage 5. The carriage 5 on the carriage guide plate 8, that is, the thermal head 4 is urged by springs to move toward the rubber strip 2. The printer includes a frame serving as a body thereof. The carriage guide plate 8 can angularly be moved by a solenoid 14.

A wire 15 is connected to the carriage 5 and trained around pulleys 16, 17 mounted on the carriage guide plate 8, and a drive pulley 18 having gears on opposite ends has the wire 15 trained therearound. The wire 15, the pulleys 16, 17, and the drive pulley 18 jointly constitute a carriage moving means for moving the carriage 5 along the platen 1.

Figure 3:
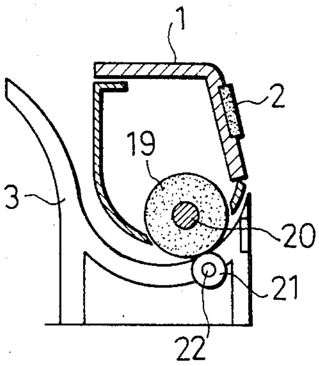
FIG. 3 is a sectional side elevational view of parts in the vicinity of a paper feed roller in the thermal printer.

The sheet of recording paper is held against paper feed rollers 19 supported on a paper feed shaft 20. The paper feed rollers 19, the paper feed shaft 20, rollers 21 and a roller shaft 22 (FIG. 3) jointly serve as a paper feed means for feeding the sheet of recording paper in the direction of the arrow 23 in FIG. 1. The sheet of recording paper is held between the paper feed rollers 19 and the rollers 21 and fed along in response to rotation of the paper feed shaft 20.

A reversible stepping motor 24 has an output shaft on which is mounted a motor gear 25 held in driving mesh with an idle gear 26 meshing with one of the gears of the drive pulley 18. A first intermittent gear 27 is held in mesh with the other gear of the drive pulley 18. A second intermittent gear 28 is held in mesh with the first intermittent gear 27 and also with a paper feed gear 29.

While the carriage 5 moves through one stroke, the drive pulley 18 makes about 7 revolutions, the first intermittent gear 27 about 2.6 revolutions, and the second intermittent gear about 0.8 revolutions. Upon intermittent operation between the second intermittent gear 28 and the paper feed gear 29, the paper feed gear 29 is angularly moved through a certain desired angle when the sheet is fed along, through about 40 degrees when a reference position of the carriage 5 is detected, and it not angularly moved at other times.

Figure 4:
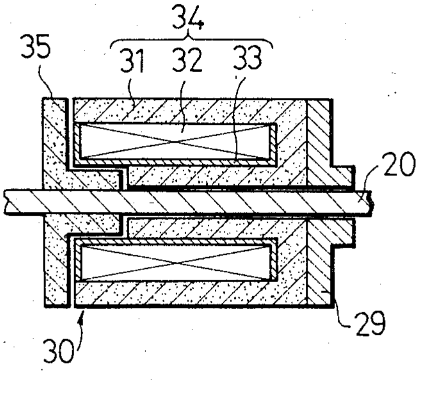
FIG. 4 is an enlarged cross-sectional view of an electromagnetic clutch in the thermal printer.

An electromagnetic clutch 30 has one end connected to the paper feed gear 29 and the other end to a portion of the paper feed shaft 20. More specifically, as shown in FIG. 4, the electromagnetic clutch 30 is composed of a clutch body 34 comprising a first yoke 31 and a bobbin 33 with an exciting coil 32 wound therearound, and a second yoke 35 movable slightly in axial directions and normally urged in a direction away from the first yoke 31. The clutch body 34 is coupled with the paper feed gear 29 for reciprocable angular movement therewith through a certain angle. Such movement prevents lead wires of the exciting coil 32 from being entangled around the electromagnetic clutch 30 as it is angularly moved. The paper feed shaft 20 extends axially centrally through the first and second yokes 31, 35. The paper feed shaft 20 is force-fitted in the second yoke 35 or engages therewith through a non-circular, such as elliptical, cross-sectional configuration so that the paper feed shaft 20 and the second yoke 35 will rotate with each other. The first yoke 31 and the paper feed shaft 20 are out of mutual engagement for independent angular movement.

Movement of the carriage 5 and paper feed operation in the thermal printer will be described with reference to FIG. 1. Designated in FIG. 1 at A is a reference position for the carriage 5, PF a paper feed area, and B a printing area, Sl a printing position for a first character position, that is, a print starting position, and S80 a printing position for an eightieth character position, that is, a print ending position.

When the power supply is switched on, the motor 24 is rotated to rotate the drive pulley 18 through the motor gear 25 and the idle gear 26 to pull the wire 15 for bringing the carriage 5 to the reference position A. Upon detection of the carriage 5 having reached the reference position A, the motor 24 is reversed to rotate the motor gear 25, the idle gear 26, and the drive gear 18 in an opposite direction. The carriage 5 is now caused by the wire 15 to move beyond the paper feed area PF into the printing area B as indicated by the arrow 37, whereupon desired characters are printed on the recording paper by the thermal head 4.

While the carriage 5 is positioned in the paper feed area PF, the paper feed gear 29 is reciprocably turned through a prescribed angle range. As the paper feed gear 29 is turned in a forward direction, the electromagnetic clutch 30 is energized to magnetically attract the second yoke 35 to the first yoke 31. The paper feed shaft 20 is now turned slightly with the paper feed gear 29 through the electromagnetic clutch 30. At the same time that the paper feed gear 29 has finished the angular movement in the forward direction, the electromagnetic clutch 30 is de-energized to move the second yoke 35 away from the first yoke 31, and only the paper feed gear 29 is moved in a backward direction. By repeating reciprocating movement of the paper feed gear 29 and energization and de-energization of the electromagnetic clutch 30, the paper feed shaft 20 is rotated in one direction to feed the recording paper as held between the paper feed rollers 19 and the rollers 21 (FIG. 3) in the direction of the arrow 23 (FIG. 1) for feeding a new line. During printing, the paper feed gear 29 is not turned, and the recording paper remains at rest.

When printing proceeds to the position S80, the motor 24 is reversed again to rotate the motor gear 25, the idle rear 26, and the drive gear 18 are rotated in the reverse direction to cause the wire 15 to move the carriage 5 back in the direction of the arrow 38. During this time, the paper feed gear 29 is not turned and the recording paper still remains at rest. When the carriage 5 reaches the position S1 and is about to enter the paper feed area PF, the paper feed gear 29 starts being turned by the second intermittent gear 28.

As the carriage 5 reaches a terminal end of the paper feed area PF, the motor 24 is reverse to effect operation which is a reversal of the above operation. More specifically, the reference position A for the carriage 5 is detected only once at first, thereafter the carriage 5 is reciprocably moved in the paper feed area PF and the printing area B for an interval dependent on the amount of characters and the like to be printed. The recording paper is fed along to a prescribed interval when the paper feed gear 29 is turned while the carriage 5 is positioned in the paper feed area PF.

Although the recording paper has been described as being fed in the direction of the arrow 23 of FIG. 1, the recording paper may be fed in a direction opposite to the direction of the arrow 23 by controlling the energization and de-energization of the electromagnetic clutch 30 in a manner which is a reversal of the manner described above. That is, the recording paper can be fed back by energizing and de-energizing the electromagnetic clutch 30 in the reversed sequence in the paper feed area PF while the stepping motor 24 is rotated in one and opposite directions.

While in the above embodiment the thermal printer to which the present invention is applied has the print tape 6 with its hot-melt material transferable to the recording paper by the thermal head 4, the present invention is not limited to such a thermal printer but may be applied to a thermal printer of the type which has no print tape 6 and no tape cassette 7, by employs recording paper of a special type which can be discolored by the application of heat.

While the present invention has been described as being applied to the thermal printer, the invention is applicable to a pen-type printer, a wire dot-matrix printer, and other impact printers.

In the above embodiment, the stepping motor 24 is used as the drive motor. However, an ordinary reversible motor with an optical or electric rotary encoder may be employed as the drive motor.

With the arrangement of the present invention, as described above, an electromagnetic clutch is used instead of a conventional ratchet so that when the motor is turned through an angular interval corresponding to one pulse applied, for example, to turn a paper feed driver through a corresponding angle, a rotatable paper feeder can be rotated through the same angle by the electromagnetic clutch. Accordingly, by repeating reciprocable movement of the paper feed driver and energization and de-energization of the electromagnetic clutch, the line-to-line interval can be adjusted as desired or graphic patterns can be printed, resulting in an improved printer function.

Although a certain preferred embodiment has been shown and described, it should be understood that many changes and modifications may be made therein without departing from the scope of the appended claims.

What is claimed is:

1. A printer comprising:

(a) a reversible motor;

(b) a paper feed driver angularly movable through a desired angle in response to operation of said motor;

(c) a paper feed rotatable for feeding a sheet of paper; and (d) means including an electromagnetic clutch operatively connected between said paper feed driver and said rotatable paper feeder, said electromagnetic clutch comprising a first yoke, a second yoke disposed in confronting relation to said first yoke normally in spaced relation thereto, and an exciting coil wound around one of said first and second yokes, said first yoke being coupled to said paper feed driver, said second yoke being coupled to said rotatable paper feeder, so that when said paper feed driver is turned in a direction to feed the sheet of paper, said exciting coil is energized to attract said first and second yokes magnetically to each other to thereby cause said paper feed driver to rotate said rotatable paper feeder to feed said sheet of paper through said electromagnetic clutch.

2. A printer according to claim 1, wherein said rotatable paper feeder comprises a paper feed shaft supporting at least one paper feed roller for contact with the sheet of paper, said exciting coil being mounted on said first yoke, said paper feed shaft being fixed to said second yoke and extending relatively rotatably through said paper feed driver and said first yoke.

3. A printer according to claim 2, wherein said paper feed shaft extending centrally through said first and second yokes and said paper feed driver, said second yoke being movable axially of said paper feed shaft and normally urged in a direction away from said first yoke.

* * * * *